US009838510B2

(12) United States Patent
Smith et al.

(10) Patent No.: US 9,838,510 B2
(45) Date of Patent: Dec. 5, 2017

(54) METHOD OF CONFIGURING A DEVICE FOR COMMUNICATIONS SERVICE ACTIVATION

(75) Inventors: Fraser Smith, London (GB); Mohit Punwani, London (GB); Michael I Strange, London (GB); Trevor Mensah, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 756 days.

(21) Appl. No.: 13/499,171

(22) PCT Filed: Sep. 9, 2010

(86) PCT No.: PCT/GB2010/001706
§ 371 (c)(1),
(2), (4) Date: May 10, 2012

(87) PCT Pub. No.: WO2011/039496
PCT Pub. Date: Apr. 7, 2011

(65) Prior Publication Data
US 2012/0220268 A1    Aug. 30, 2012

(30) Foreign Application Priority Data

Sep. 30, 2009 (GB) .................................. 0917159.6

(51) Int. Cl.
*H04M 3/00* (2006.01)
*H04L 29/06* (2006.01)
(Continued)

(52) U.S. Cl.
CPC .......... *H04L 69/14* (2013.01); *H04L 41/0806* (2013.01); *H04L 41/5054* (2013.01);
(Continued)

(58) Field of Classification Search
CPC ..... H04W 8/265; H04W 12/06; H04W 76/02; H04W 76/021; H04W 76/025; H04W 76/026; H04L 63/08
(Continued)

(56) References Cited

U.S. PATENT DOCUMENTS

2004/0114553 A1* 6/2004 Jiang et al. .................... 370/328
2005/0186953 A1* 8/2005 Harris ...................... H04M 1/04
455/419
(Continued)

FOREIGN PATENT DOCUMENTS

EP    1 705 867     9/2006
EP    1763266      3/2007
(Continued)

OTHER PUBLICATIONS

International Search Report for PCT/GB2010/001706 dated Jan. 25, 2011.
(Continued)

*Primary Examiner* — Joshua Schwartz
(74) *Attorney, Agent, or Firm* — Nixon & Vanderhye P.C.

(57) ABSTRACT

A method of generating device-specific configuration data during the initial set up of a device comprises, during a configuration process running on the device, sending from the device a first message and including a device identifier to a server using a first mode of communication associable with a service identifier, sending from the device a second message including the device identifier to a server using a second mode of communication not associable with said service identifier, processing the first message to associate the device identifier with the service identifier, and processing the second message to query if the device identifier has been previously associated with the service identifier, and if so, sending device-specific configuration data to the device
(Continued)

for use during the configuration process, wherein after the configuration process is completed, the device-specific configuration data enables authentication using said service identifier when the device uses said second mode of communication.

29 Claims, 5 Drawing Sheets

(51) Int. Cl.
H04L 12/24 (2006.01)
H04M 3/42 (2006.01)
H04M 3/533 (2006.01)
H04M 7/00 (2006.01)
H04L 29/08 (2006.01)
H04L 12/58 (2006.01)

(52) U.S. Cl.
CPC ............ *H04L 51/043* (2013.01); *H04L 67/34* (2013.01); *H04M 3/42068* (2013.01); *H04M 3/533* (2013.01); *H04M 7/0024* (2013.01); *H04L 51/04* (2013.01); *H04L 63/08* (2013.01); *H04M 2207/203* (2013.01)

(58) Field of Classification Search
USPC .......................................... 455/411, 418–419
See application file for complete search history.

(56) References Cited

U.S. PATENT DOCUMENTS

| | | | |
|---|---|---|---|
| 2008/0075244 A1* | 3/2008 | Hale et al. | 379/88.13 |
| 2008/0182614 A1 | 7/2008 | Cormier et al. | |
| 2009/0156209 A1 | 6/2009 | Franklin et al.et al. | |
| 2009/0170471 A1* | 7/2009 | Ferro et al. | 455/410 |
| 2010/0323696 A1* | 12/2010 | Cherian et al. | 455/435.2 |
| 2011/0098030 A1* | 4/2011 | Luoma | 455/419 |

FOREIGN PATENT DOCUMENTS

GB 2 442 040 3/2008
WO 2008/006213 1/2008

OTHER PUBLICATIONS

Search Report (1 pg.) dated Jan. 20, 2010 issued in corresponding GB Application No. GB0917159.6.
Search Report (1 pg.) dated Feb. 12, 2010 issued in corresponding GB Application. No. GB0917159.6.
International Preliminary Report on Patentability dated Apr. 3, 2012 issued in corresponding International Application No. PCT/GB2010/001706.

* cited by examiner

METHOD OF CONFIGURING A DEVICE FOR COMMUNICATIONS SERVICE ACTIVATION

This application is the U.S. national phase of International Application No. PCT/GB2010/001706 filed 9 Sep. 2010 which designated the U.S. and claims priority to GB 0917159.6 filed 30 Sep. 2009, the entire contents of each of which are hereby incorporated by reference.

BACKGROUND

The present invention relates to a method of configuring a device to automatically provide authentication information to retrieve data from a remote server. In particular but not exclusively, the invention relates to a method which configures a device to use a connectionless packet-oriented communications protocol session for a service which requires identification of a physical communications line to which the device is attached.

The Internet Protocol is a connection-less packet-based communications protocol over which a number of telephony services can be provided, for example, VoIP, and also voicemail services. Access to voicemail service information using a conventional telephone device is well known in the art. Voicemail may be stored on the same telephone device or remotely on a server which provides a data storage facility for mail messages for several devices. Voicemail messages are stored on a device if it has functionality to retrieve data from a remote storage facility or if a message is recorded directly on the device. However, a user of a PSTN phone cannot hear a voicemail message which has been left or is being left for the PSTN phone number if they are speaking to another user on the PSTN line as the line is occupied.

In some voicemail services, in order to access voicemail message information, a user needs to log-in and provide authentication information such as a password. This is time-consuming and problematic for the user. A device cannot automatically retrieve information if a user must provide such credentials each time new information is to be retrieved.

SUMMARY STATEMENTS OF INVENTION

The aspects of the invention are as set out by the accompanying claims and selected embodiments are as set out by the accompanying claims and description below. The invention may comprise any suitable combination of aspects and selected embodiments apparent to one of ordinary skill in the art.

In a communications system in which a service platform stores service information associated with a plurality of different service identifiers and requires one or more credentials to provide access to service information which is uniquely associated with one of said plurality of service identifiers, a first aspect of the invention seeks to provide a method of generating device-specific configuration data during the initial set up of a device, to enable the device to automatically access service information associated with one of said service identifiers, the method comprising:
during a configuration process running on the device:
using a first mode of communication to send from the device a first message which includes a device identifier to a server;
sending from the device a second message including the device identifier to a server using a second mode of communication;
processing the first message to associate the device identifier with a service identifier derivable from the first mode of communication;
processing the second message to query if the device identifier has been previously associated with the service identifier, and if so,
sending device-specific configuration data to configure the device for use during the configuration process,
wherein the configured device is capable of automatically communicating with said service platform using said second mode of communication and of being authenticated by said service platform using at least said service identifier.

In this way, the device can be in use, for example receiving or making a telephone call using the first mode of communications, at the same time as voicemail information associated with the communications line CLI is provided via the second mode of communications to the device. In this way, even whilst the PSTN line is still occupied, voicemail left for the PSTN line can be retrieved by the device and if necessary voicemail information displayed (or even played) on the device. This enables a voicemail message left by one calling party to be played back and listed to whilst another call is on-going. The playback may be both over the device and over the other call if the device has appropriate playback functionality.

The service identifier may enable the device to use said second mode of communication with a remote server to access data associated with a service provided in a network domain associated with said first mode of communication.

The message may be sent using said first mode of communication over a public switched telephone network communications line and said service identifier comprises the calling line identity for said communications line.

The second mode of communication may comprise a data session supported by a connectionless communications protocol.

The first message may conform to a short message service communications protocol.

The service identifier may be used to identify a subscription to a voicemail service.

The voicemail service may be associated with a first network domain accessible using said first mode of communications, and wherein said second mode of communications accesses said voicemail service using a second network domain.

Another aspect of the invention seeks to provide a communications system arranged to remotely configure a device to activate a service on the device, the system comprising:
a first server;
a second server;
a data store.

The first server may comprise means to associate at the remote data store a device identifier for the device with one or more identification characteristics of a physical communications line to which the device is attached using a first mode of communications on said physical communications line.

The device may comprise:
means arranged to establish a second mode of communication with the second server;
means arranged to generate a configuration request including the device identifier;
means arranged to send the configuration request to the second server using the second mode of communications for which said one or more identification characteristics of said physical communications line are not determinable by the remote server; and means arranged to configure said device to associate at least one or more of said identification characteristics for said physical communications line with the service using configuration information provided by said second server.

The second server may comprise:

means arranged to process the received request to extract the device identifier;

means arranged to generate a configuration query including the device identifier;

means arranged to send the configuration query to a data store;

means arranged to retrieve, in dependence on said device identifier in said configuration query, configuration information including said one or more identification characteristics for said physical communications line;

means arranged to forward said configuration information to said device via said second server; and means arranged to associate the service for said device with one or more identification characteristics of said physical communications line.

The device may further comprise:

means for generating a message including said device identifier;

means for sending said message over said communications line using said first mode of communication to said first server.

The first server may further comprise:

means arranged to process the message to extract said one or more identification characteristics of said physical communications line and said device identifier; and means arranged to forward said one or more identification characteristics of said physical communications line and said device identifier to said data store.

The message may comprise a small message service message.

The second server and the first server may provide functionality which is hosted on a shared physical platform. Equivalently, the first server may be the second server.

The service may comprise a voice mail notification service. The second server may comprise means arranged to activate the service for the device by generating configuration information for the device, the configuration information enabling the device to generate requests for the service which comprise a service identifier, for example, a calling line identity of the public switched telephone network telecommunications line to which the device is attached.

The one or more identification characteristics of said physical communications line may comprise a PSTN calling line identifier for the communications line to which the device (12) is attached.

Another aspect of the invention comprises a method of configuring a device to enable it to automatically generate a request for service information stored in association with a service identifier and send the request to a service platform, the method comprising:

determining the service identifier from a first communication sent by the device using a first mode of communication;

storing the service identifier in association with a device identifier;

sending a second communication using a second mode of communication to a remote platform, the communication including the device identifier;

extracting from the second communication the device identifier;

querying if said device identifier has been stored in association with a service identifier, and if so, generating configuration information dependent on said service identifier and said device identifier; and configuring the device using said configuration information, the configuration information configuring the device to generate at least one said request for service information, wherein when said at least one request is received by said service platform, one or more credentials including said service identifier required to access said service information are presented to said service platform.

The method may further comprise:

generating the request including said device identifier;

sending the request;

processing said request to extract said device identifier;

querying said data store with said device identifier to retrieve said service identifier;

wherein the retrieved service identifier is presented to said service platform to access said service information.

The method may further comprise:

configuring the device using said configuration information including said service identifier;

generating the request including said service identifier; and processing said request to extract said service identifier to present said service identifier.

The method may further comprise:

storing the device identifier in association with a plurality of different service identifiers;

wherein, when a request for service information is received, information for each different service identifier is retrieved.

The requests for information for each different service identifier may be automatically generated, and when information is retrieved, a notification of that information for said service identifier has been received may be displayed on the device.

Another aspect of the invention seeks to provide a method of generating device-specific configuration data during the initial set up of a device, which comprises, during a configuration process running on the device, sending from the device a first message and including a device identifier to a server using a first mode of communication associable with a service identifier, sending from the device a second message including the device identifier to a server using a second mode of communication not associable with said service identifier, processing the first message to associate the device identifier with the service identifier, and processing the second message to query if the device identifier has been previously associated with the service identifier, and if so, sending device-specific configuration data to the device for use during the configuration process, wherein after the configuration process is completed, the device-specific configuration data enables authentication using said service identifier when the device uses said second mode of communication.

Another aspect of the invention comprises a device arranged for use in any system or method aspect of the invention.

One or more embodiments of the invention seek to provide a method of activating a device to enable the device to retrieve service information which is uniquely associated with a specific service subscription. The device is configured and activated using unique configuration information so that service information can be retrieved without requiring manual input (e.g. by a user) of data which identifies the specific service subscription and/or manual input of additional authentication data such as a username and/or password. In this way, the configured device is able to automatically retrieve the service information from a remote service platform using a communications system.

The service information is stored in association with a service identifier, which associates the stored data with a specific service subscription. The service identifier may comprise, for example, a user identifier and/or a device identifier, and/or a telephone number identifier such as, for example, a calling line identifier in a wireline network and/or or equivalent wireless network subscription identification information such as a subscriber information module and/or international mobile station equipment identifier. Access to the data identified by the service identification information may require additional authentication information to be provided, either within the initial service request or in subsequent service requests. For example, authentication such as a user identity and password combination may be requested before service information for a particular service subscription is provided.

The methods of configuring a device according to some embodiments of the invention thus seek to configure each device uniquely so that a credential data set comprising one or more service identifier(s) and/or authentication information can be automatically provided to a service platform either directly or indirectly in order to access service information associated with a unique service identifier. Some embodiments of the invention seek to provide a method for configuring a device with a unique credential data set which obviates and/or mitigates the need for any manual input of one or more items of credential data required to retrieve data associated with a specific service subscription from a remote server.

Each service platform is capable of providing service information to a large number of devices in the same communications system however each device is configured to retrieve only information for which the respective credentials provide access. The credentials are automatically generated either uniquely by the device and/or by the device in combination with a remote platform, which may comprise the service platform. In this way, a device may access information associated with a service identifier which is either directly represented in the credentials provided by the device in a service request or which is derivable from the credentials in the service request generated by the device by a remote server. This enables a device to retrieve information which is specific to the service identifier from the service platform. In some embodiments where the credential information requires additional information to be provided by a remote server, the remote server may comprise the service platform and/or one more other servers and/or data store(s) acting in combination. Some specific embodiments of the invention seek to provide a method of, and/or apparatus for, activating a connectionless session-based communications service for a device which requires the device to be associated with a calling line identity in order to receive data associated with the service from a service platform.

BRIEF DESCRIPTION OF THE DRAWINGS

Selected embodiments of the invention will now be described with reference to the accompanying drawings which are by way of example only and in which.

The best mode of the invention currently contemplated by the inventors is set out below.

DETAILED DESCRIPTION OF PRESENT EXAMPLE EMBODIMENTS

Figure 1:
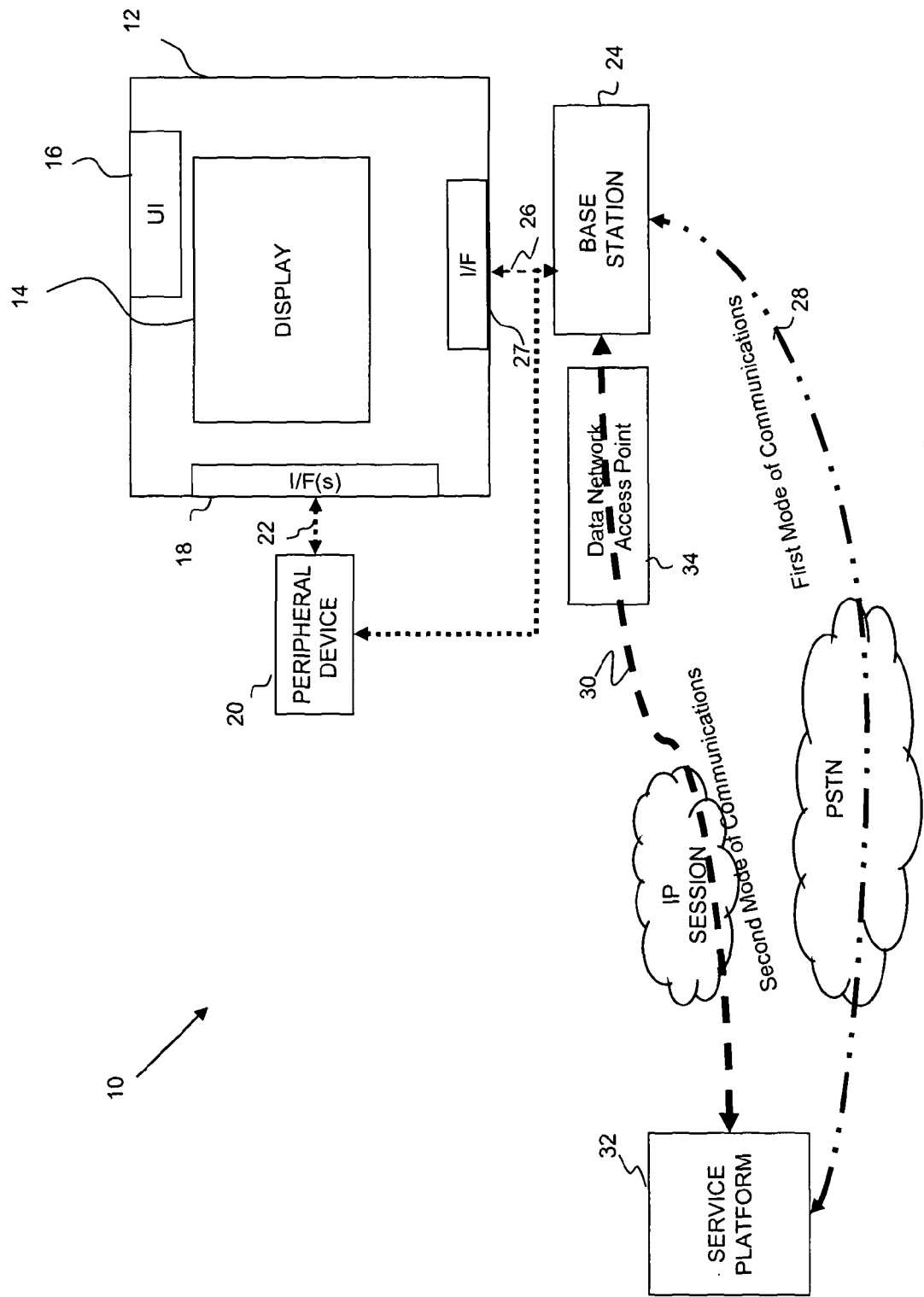
FIG. 1 shows schematically a communications system for providing a service to a device according to an embodiment of the invention.

FIG. 1 shows a communications system 10 according to an embodiment of the invention in which a communications device 12 is arranged to access and retrieve service information from a remote service platform 32 by providing appropriate credential information to authenticate a data retrieval request. The service information to be retrieved is uniquely associated with a service identifier, in this embodiment a calling line identifier. An example of a service platform 32 according to the invention is a voicemail platform.

The service platform 32 as shown in FIG. 1 is configured according to an embodiment of the invention to enable service information to be retrieved using a service request sent using a mode of communication from which the service platform cannot directly retrieve the service identifier, in this embodiment, the calling line identifier.

Communications system 10 comprises a plurality of devices 12 located on premises associated with respective communications service subscribers, although only one device 12 is shown in the embodiment of the invention shown in FIG. 1. The device 12 shown in FIG. 1 comprises suitable data processing components (not shown), a display 14 and a user interface 16 which enables a user to control operation of the device and/or provide data input. Device 12 is provided with two modes of communications capability.

Telephone-type functionality, for example, may be provided on device 12 through appropriate transmission and receiving components for connecting to the public switched telephone network (PSTN), means to go on/off-hook, microphone and speaker components and/or device 12 may be provided with a communications-enabled interface 18 for communicating with at least one peripheral device 20, for example, a telephone device, using a suitable communications link 22, for example via a wireless local area connection (WLAN) such as Digital Enhanced Cordless Telecommunications (DECT) such as is shown in FIG. 1.

Device 12 is arranged to communicate over a telephone communications line between the subscriber premises and the local exchange of the PSTN (not shown in FIG. 1) using at least two different modes of communications via a suitable interface 27 which provides connectivity with a separate base-station 24 via a suitable wireless or wired communication link 26. As will be apparent to those of ordinary skill in the art, in an alternative embodiment, the communications functionality of base-station 24 may be integrated into device 12 in alternative embodiments of the invention.

In the embodiment of the invention shown in FIG. 1, device 12 uses a first mode of communication 28 which is a conventional public switched telephone network (PSTN)

mode of communication. This mode provides the identity of the communications line between the local exchange of the public switched telephone network (PSTN) and the subscriber premises on which the device 12 is located and to which the device 12 is connected to via base station 24. This mode may also be used by other communications devices on the subscriber premises and the calling line identity or CLI will be directly derivable for the communications traffic sent using this mode of communication by any of the devices using the line in this mode of communication.

A second mode of communication 30 uses the same physical communications line as the first but supports traffic send using a connection-less data-packet mode of communication. The second mode of communication therefore does not associate the traffic with the physical line's CLI between the customer premises and the local exchange of the PSTN. This means that the CLI is not directly derivable for communications traffic send using the second mode of communication.

In the communications system shown in FIG. 2, device 12 uses the second mode of communication 30 to establish a data session between the device 12 and a service supporting platform or server 32. The same server 32 also provides an equivalent service over the PSTN using the first mode of communication 28. In alternative embodiments of the invention, however, a PSTN service is not supported by the same session-based service platform 32.

The second mode of communication 30 provides a data communications service which is an "always on" type of service in one embodiment of the invention, for example, a broadband service which offers a relatively high-bandwidth connection at least in the direction of the local exchange to the subscriber premises. Such services may use data communications protocols such as the Asynchronous Digital Subscriber Line (ADSL) for example. The second mode of communications may be accessible directly by the device 12 and/or base station 14 or be via a suitable data network access point 34, for example, a router or hub. In one embodiment of the invention, the access point 34 supports wireless connectivity with the base station 24 and/or device 12 and/or with the server 32, using an appropriate high-bandwidth wireless communications protocol, for example, WiMax and/or WiFi.

Although in the embodiment shown in FIG. 1, the second mode of communication 30 in one embodiment of the invention utilises the same communications line linking the subscriber premises to the local exchange of the public switched telephone network (PSTN) as the first mode of communication 28, in other embodiments it may utilise a wireless connection for a least part of the path taken between the device and the server 32. However, the identity of the telephone line associated with the subscriber premises is only capable of being detected from activity on the line associated with the first mode of communication 28. The second mode of communication uses a data session, for example, and IP session as is shown schematically in FIG. 1. The data session is established and supported using data traffic which is packetised using a protocol such as the Internet Protocol which disassociates the data from a fixed path to its destination. As a result the data traffic sent using the second mode of communication 30 does not automatically contain any information providing a CLI for the physical line to the subscriber premises. As a result, the CLI cannot be automatically determined from a data session, for example an Internet Protocol session, even when running over the same physical line as the first mode of communication 28 uses when using the second mode of communication 30.

As previously mentioned above, in the embodiment of the device 12 shown in FIG. 1, the device 12 communicates using both the first and second modes of communication via one or more suitable interfaces 27 with base station 24. However, in alternative embodiments of the invention, device 12 incorporates one or more or all of the communications functionality of the base-station 24 directly. Where all communications functions are incorporated into the device 12 and a separate base-station 24 is not required. Similarly, as would be well known to one or ordinary skill in the art, either or both of the base-station 24 and/or device 12 may also incorporate the communications functionality of a data network access point 34 in some embodiments of the invention.

Voicemail messages which are left for a PSTN telephone number are conventionally accessed using a PSTN line by a telephone device which contacts the PSTN voicemail server over a PSTN line using a conventional telephone communications mode which provides a calling line identifier (CLI) for the PSTN line used by the device. However, device 12 is configured to use the second data communications mode 30 to establish a connection-less packet-based session with a remote service providing platform 32. This mode of communications does not enable the service platform to determine a service identifier such as a calling line identifier (CLI) from the communications mode via which the service request was sent and which would need to be presented to a PSTN voicemail server to access voicemail service information such as voicemail messages.

A service identifier (for example a CLI) needs to be presented to the service platform 32 to ensure that only service information stored in association with that service identifier is provided to device 12. Additional authentication of the request may also be desirable.

The service platform 32 is arranged to provide access to service information stored in association with a particular service identifier (for example, service information such as voicemail and/or equivalently any other subscription specific service data, such as video-messages, email etc which have been stored in association with a particular PSTN telephone number or CLI). The service identifier enables service information stored for one service subscriber to be distinguished from service information stored for other service subscribers who also access service information via the service platform 32.

The device 12 shown in the embodiment of the invention of FIG. 1 is able to use the second data communications mode to access the service information from the service platform 32 only if the request contains sufficient information to enable a service identifier to be presented to the service platform 32. This requires the device 12 to be configured appropriately so that it is able to establish the necessary data connection over which a request for service information can be sent. The device needs to be configured to include in the request sufficient information to enable credentials to be presented to the service platform, for example, the request may include the device identifier and/or service identifier and/or any additional authentication information which needs to be presented to the service platform 32 if the device 12 is to retrieve service information.

Figure 2A:
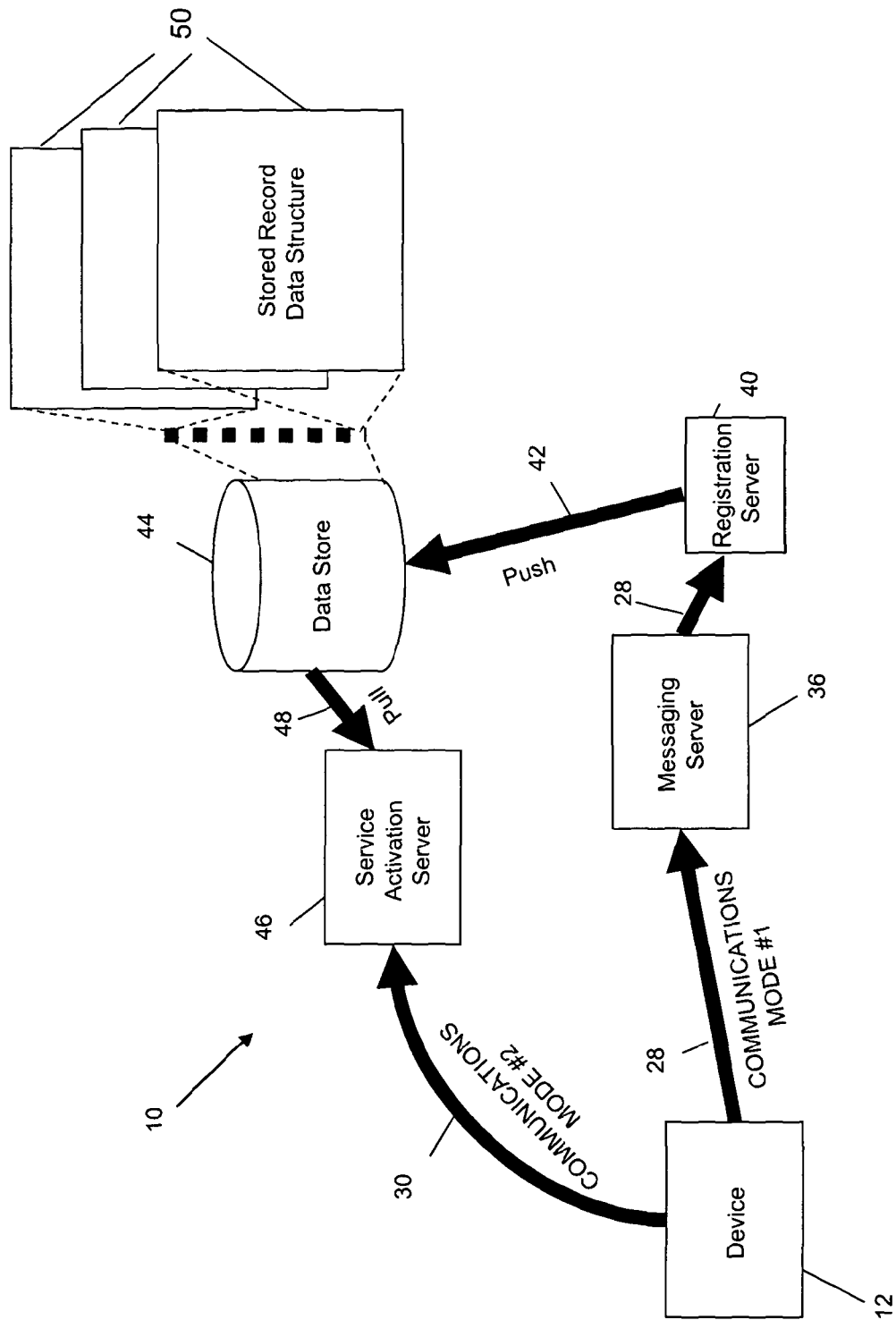
FIG. 2A shows schematically a service activation system for activating a device to provide a service according to a general embodiment of the invention.

FIG. 2A of the accompanying drawings shows an embodiment of a device configuration process according to the invention in which as part of the configuration process, a configuration computer program is run on the device 12. The same numbering system as was used in FIG. 1 is retained for like elements of the invention in FIG. 2A.

In FIG. 2A, the device runs a configuration computer program which automatically triggers the generation of a first communications message which uniquely identifies the device by incorporating a unique device identifier, for example, its serial number which is addressed to a registration server 40.

The first communications message is then sent out over the communications line via the local exchange using the first mode of communications 27 via a message server 36 to the addressed registration server 40. For example, in one embodiment of the invention, the first communications message comprises a short message service (SMS) text message and message server 26 comprises a PSTN SMS server.

The message server 36 processes the received first message and processes it to extract the forwarding address for the registration service and the CLI of the line used by the first communications mode 38. The message server 36 determines from the registration server address that even if that CLI has not registered for the message service, the message to the registration server should be forwarded. This is advantageous as it means that a user of the service for which the device 12 is to be configured need not have previously registered with the message server 36 for the messaging service over the PSTN.

As shown in FIG. 2A, the first communications message then forwarded to a registration server 40 which processes the message to determine the presence of the device identifier and associates this identifier with the service identifier, here the CLI of the communications line used by the first mode of communications via which the first communications message was sent.

The registration server 40 then pushes the service identifier (the CLI) and the device identifier information to a data store 44 to locate and/or update credential data stored on data store 44 to associate the service identified by the CLI with the device identifier and the CLI. For example, a data record 50 may be stored which has a data structure which associates the device identity of device 12 with the CLI.

In some embodiments of the invention, the data record 50 has a data structure which associates the CLI with one or more entries for device and/or service characteristics, for example, if one or more services are to be provided for a CLI and if so, whether the service has been activated on a particular device identified in the data structure. This enables service identifiers to be associated with the device identifier for a plurality of different service subscriptions and also enables unique configuration information, for example, additional authentication information to be associated with a particular service. The data is stored in one embodiment in such a way that a look-up operation can be performed using the device identifier to retrieve the associated credential information, for example, the associated CLI and/or any authentication information such as a passwords etc.

In FIG. 2A the registration server 40 pushes the service identifier (the CLI) and any other information extracted from the SMS such as the device identifier via a communications link 42 to a remote data store 44. However, it is not essential for data store 44 and registration server 40 to be supported on different platforms. The data store 44 may have any suitable data architecture, for example, it may comprise a database suitably configured to associate subscriber information with a particular device ID and/or CLI for billing and/or service provision related purposes.

In the embodiment, shown in FIG. 2, after data store 44 has been updated, the CLI is associated with at least one device identity for the device 12. In embodiments of the invention where the messaging service used by device 12 to send the first message to registration server 40 is not always real-time or fully reliable, the configuration program script running on the device waits a suitable amount of time before proceeding to configure the device by generating a second communications message which is sent to service activation server 46 using the second mode of communications 30 to request activation of a service. The service to be activated according to the invention requires a CLI to be known in order to retrieve data for that service, for example, a voice-mail message can only be retrieved in association with the telephone number with which it was left for. Alternatively, however, once the data record 50 has been updated to indicate that the CLI is now associated with a device identifier and/or with other authentication information, the registration server may generate an acknowledgement message, e.g., an acknowledgment SMS, whose receipt triggers the device 12 to initiate a data session.

In the absence of any triggering message event, in one embodiment the device 12 establishes a data session, for example, an Internet Protocol session with service activation server 46 before the delay period has passed and then waits for the delay period to expire before sending a second communication message which requests activation of a service in one embodiment of the invention. In an alternative embodiment, it waits until after the delay period has passed before establishing a data session with the service activation server 46, and then sends the second communications message.

The second communication message includes data which at least identifies the device 12 by means of the device identifier and the service to be activated by means of a service identifier. The service activation server 46 receiving the second message processes the received message to extract this data and queries the data store to determine the CLI which is associated with the device identifier which the service identifier indicates is required. The data records 50 of the data store 44 thus have a data structure enabling a data record 50 to be retrieved by the activation server 46 on the basis of a device identifier look-up operation or similar index retrieval operation. If the device identifier is determined to be associated with a CLI, the activation server 46 amends the data record 50 to indicate that the service is now active for the device and CLI. The data record 50 for a particular CLI may also provide unique configuration data to be used to configure the device 12 to utilise the requested service. This unique configuration data may be sent to the service activation server 46 for forwarding to the device 12 using the data session supported by the second mode of communication 30 in one embodiment of the invention and/or the service activation server 46 generates configuration data in dependence on data provided by the data record 50 for that CLI in data store 44.

The device 12, after the configuration data has been downloaded from the service activation server 46, completes the configuration process. The configuration process provides sufficient information to enable service requests to be automatically generated by the device 12 so that service information for the service identifier with which the device identifier has been associated in data record 50 can be accessed by the device. In this way, device 12 is able to access data provided by the service platform 32.

Figure 2B:
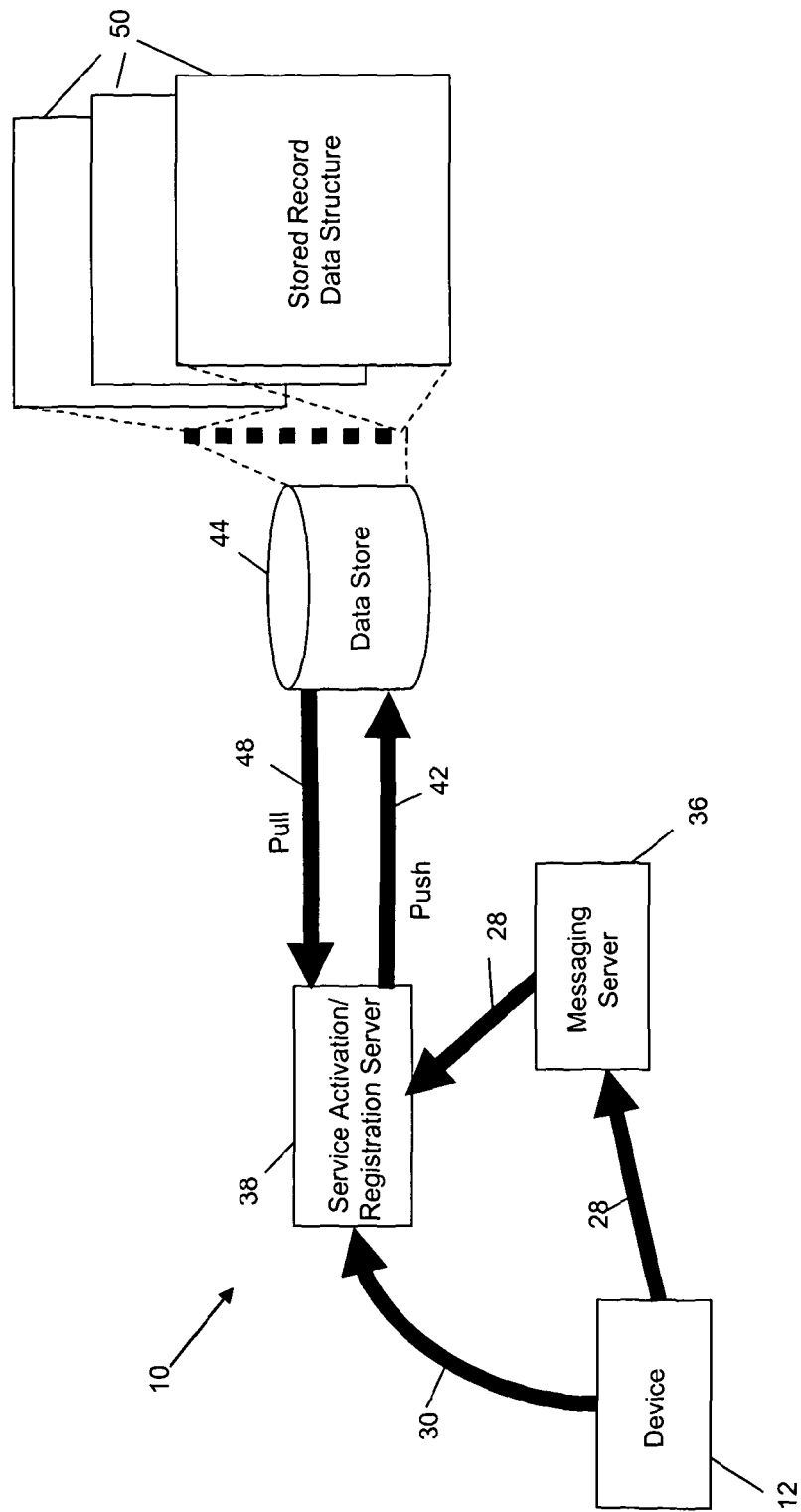
FIG. 2B shows an alternative embodiment of a service activation system according to the invention.

FIG. 2B shows an alternative embodiment in which the registration server functionality is hosted on the same physical platform 38 as the service activation server functionality, but in which all other elements having like functionality have retained the numbering scheme used in FIG. 1 and FIG. 2A.

Figure 3:
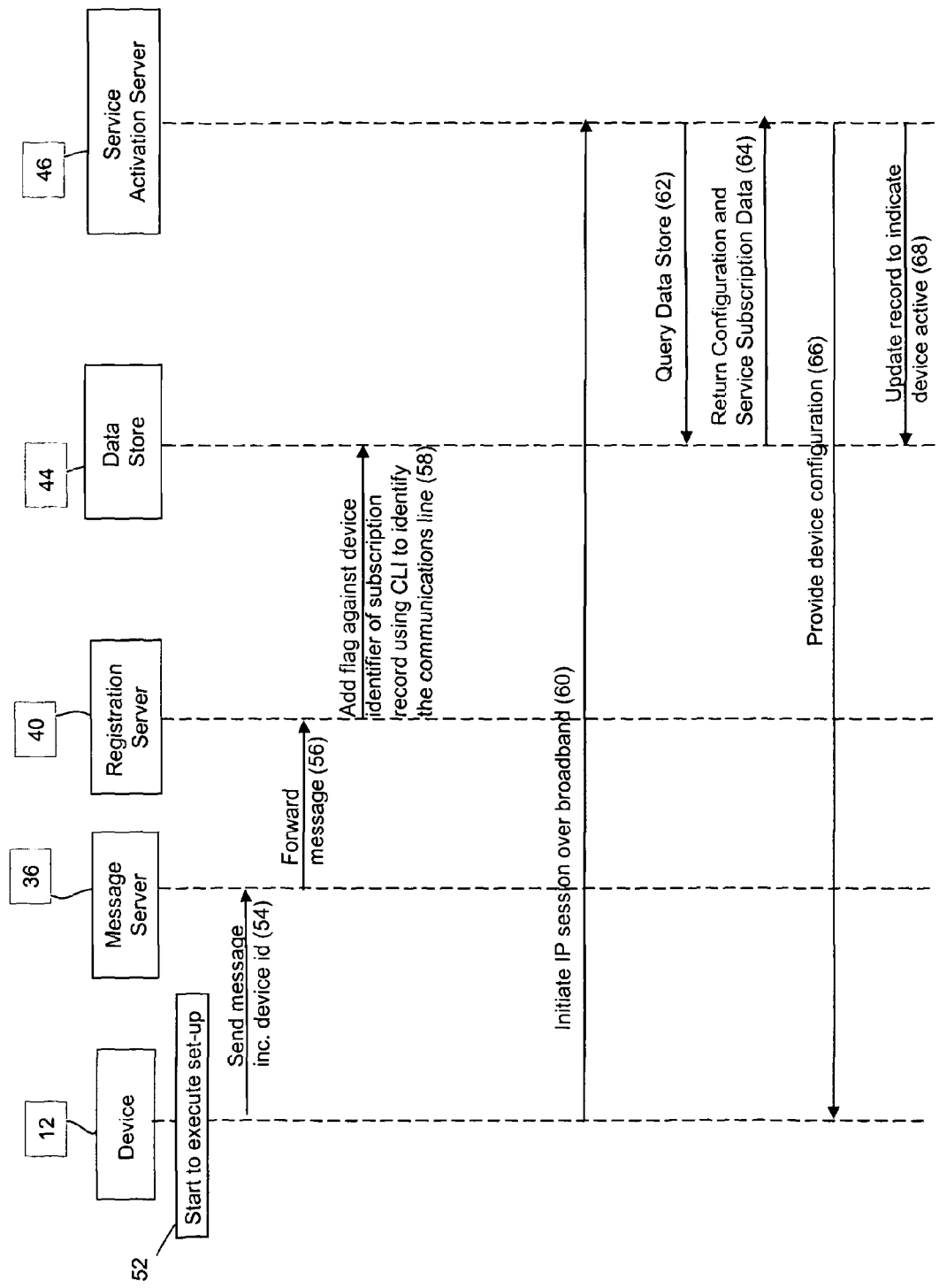
FIG. 3 shows a flow diagram for activating service on a device according to an embodiment of the invention.

FIG. 3 shows a flow chart for a service activation configuration process for a device 12 according to an embodiment of the invention. In FIG. 3, device 12 is shown starting to execute the device set-up or configuration program (step 52). A first message is generated for the registration server 40 which includes a device id (step 54). The first message is forwarded by message server 36 to the registration server 40 (step 56) regardless of whether the message service was previously configured for that communications line service subscription. The registration server 40 adds a flag to the data record 50, held in data store 44. Data record 50 comprises, for example, a customer subscription record which associates the device identifier with a particular service subscription. The registration server 40 pushes information to the data store 44 to enable the device identifier to be associated with a particular CLI—and either confirms that he device is on a particular CLI or adds the CLI information to the data record 50. The subscription record 50 then stores the CLI in association with the device identifier (step 58).

The device 12 then initiates at some subsequent point in time an IP session over broadband with the service activation server 46 (step 60). In response to receiving a message over the IP session to activate the service, the service activation server 46 queries the data store 44 (step 62) to return configuration and service subscription data 64 (step 64). The service activation server 46 then provides device configuration information to the device 12 using the broadband IP session (step 66) and also updates the data record 50 to show the service is active on the device 12 (step 68).

The process of activation which requires a service activation message to be sent over the broadband IP session between the device 12 and the service activation server may need to be re-iterated if no subscription record 50 can be located by the server which associates the device identifier with a CLI. If the session is maintained between reiterations, the process is reiterated by regenerating the service activation request message. If the data session has timed out or otherwise lapsed or aborted, a new data session must be established between the device 12 and the service activation platform 46 in order to re-iterate the service activation process. Once the data session has been established and the second message has been received by the service activation server 46, the server 46 generates a new query to determine the status of the device and the CLI of the communications line to which it is connected which is held in a record in data store 44, and the service activation process continues as before.

The query process performed by the service activation server is implemented using any suitable technique known in the art which is appropriate for the data structure of the data records 50 held in the data store 44. For example, a look-up operation may be performed based on the device identifier when this is held in an index field of the data records 50. Alternatively, the data records 50 can be pre-filtered, for example, to only scan those which are indicated as associated with the requested service. Another pre-filter might remove records which have not been flagged by the registration process as comprising a Device ID and associated CLI. Regardless of whether all or only a subset of the records is scanned, or subjected to a look-up process, a successful search query will result in locating a record based on the device identity which comprises information on the CLI of the communications line to which the device with that device identity was recorded as being attached by the registration server 40. If the result of the query does not locate a record which associates the device identifier of the second communications message with a CLI, it is assumed that the first message has not been received by the registration server 40 and/or not pushed forward and stored yet. The activation process then halts.

As the messaging service is not a real-time or reliable service, it is possible that the first communications message has not yet been fully processed and to allow for this the registration and/or activation processes is/are repeated either in full or in part.

The service activation server 46 uses the CLI and device identifier to generate configuration data for the device 12 to access the requested service by enabling the device to include some indication of the CLI within a service request. The configuration data includes additional information including information relating to one or more characteristics of the communications device/line/service/user who has subscribed to the service in some embodiments of the invention. The CLI and/or any other information is encrypted in some embodiments of the invention to enhance the security of the service provided.

The configuration information is then sent to the device 12 which uses the downloaded configuration information to complete the set-up process. After set-up has been complete, the device 12 is configured to be capable of automatically generating service requests and send them to the service platform 32 using the second mode of communication, the connectionless packet-based mode.

One embodiment of the invention provides a method of retrieving PSTN voice-mail messages over a broadband supported data communications session. In this embodiment, the device 12 establishes a data session with the voicemail service platform 32 using a broadband communications link. The voicemail service platform 32 receives service request messages generated by the device 12 over this data session which include a service identifier. In one embodiment, the service identifier comprises the device ID of the requesting device, which is extracted by the service platform 32 and used to query the data store 44 to determine CLI for the PSTN communications line to which the device 12 is attached and for which voicemail message data is to be retrieved. In an alternative embodiment of the invention, the voicemail service platform 32 receives the CLI from the device 12 directly embedded in the service request. Additional authentication information may also be provided by the device 12 to the service platform 32 to enable data to be provided using a higher level of security than just the CLI to authenticate the service request.

Figure 4:
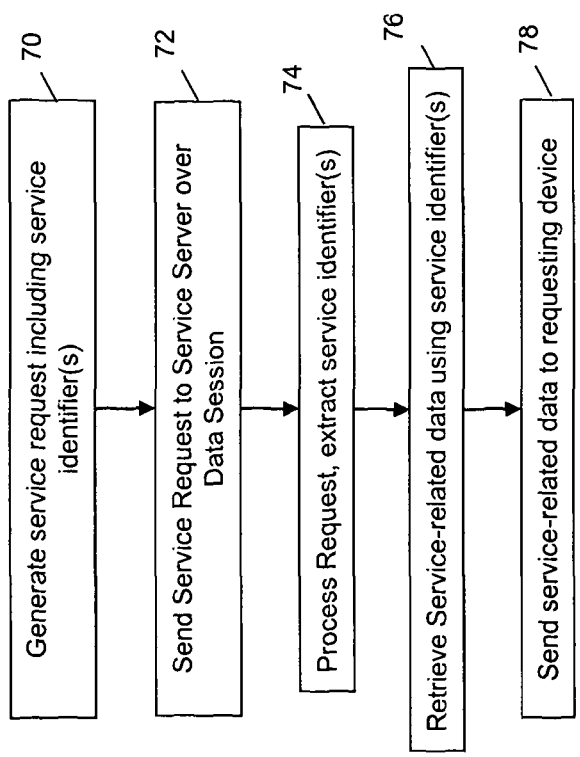
FIG. 4 shows schematically steps in the provision of a service according to an embodiment of the invention.

FIG. 4 shows steps in a method of providing a service associated with a CLI over a connection-less packet-based session between a service platform and a device configured using a method of configuration according to an embodiment of the invention.

In the embodiment shown in FIG. 4, the configured device 12 generates a service request which include a service identifier (step 70) which comprises a CLI and/or a device identifier. The service request is sent over an IP session to the service providing server 32 (step 72). The service providing server 32 processes the request to extract the service identifiers (step 74), which enables the CLI associated with a requested service to be determined directly or indirectly via a device identifier and the data store 44. The server 32 then retrieves data associated with the requested service, for example, if a voice mail service has been requested, the voice mail messages for a particular telephone number (or equivalently CLI) will be retrieved (step 76). The service-related data is then sent to the requesting device 12 by the service platform 32 (step 78) using the IP session. This enables the device 12 to automatically receive data (for example, voice-mail) over a broadband IP session which normally would require either a PSTN connection to be established which provides the CLI or for a user to enter authentication information in the absence of the CLI being provided each time the device wanted to retrieve the service data.

Alternatively, the device can be configured to send requests which include just the device identifier. The device identifier is then extracted from the request either by the service platform or by a proxy server and used to retrieve the required service identification information from the appropriate record 50 held in the data store 44. This information is then either appended or otherwise included in a request which is then presented to the service platform if a proxy server performs the lookup process or is used directly if the lookup operation is performed by the service platform to retrieve the associated service information.

One embodiment of the invention thus provides a service in which a CLI is incorporated in a service request over a data-session which removes the need for a user to be authenticated if they want to access a PSTN voice mail using a data-session. The voice-mail service provides data comprising voice messages. However, in other embodiments of the invention, messages in any appropriate media format may be forwarded to the device automatically using the invention, for example, video messages.

Known voicemail services enable voice-mail to be accessed using equipment which requires the user to notify the server with authentication details. For example, a voice-mail box associated with a PSTN line may require a user to enter a PIN and/or use the CLI of the PSTN line to authenticate the user. Mobile communications devices may use a telephone number and/or a telephone device identifier (e.g. a Subscriber Identification Module (SIM) number) in the case of a mobile communications network voicemail service.

A service activation process according to the invention thus enables a PSTN voice-mail box to be accessed by device 12 using a connection-less data session by providing the CLI of the PSTN line embedded in the voice-mail service request. In some embodiments, other authentication information may be also provided in the requests generated by the device 12 such as a user password. In this way, it is possible to automatically retrieve, for example using an IP session, a notification of a voice-mail message and/or a voice-mail message associated with a public switched telephony network (PSTN) calling line identifier (CLI).

One embodiment of the invention thus enables a device 12 to retrieve communications messages automatically and subsequently to process these and display selected information extracted from each communications message on the device.

Modifications and functional equivalents and combinations of the specific features of the embodiments of the invention described herein will be apparent to those of ordinary skill in the art, and the scope of the invention should be interpreted by the accompanying claims when construed in conjunction with the description and not just by the specific embodiments described herein.

For example, those of ordinary skill in the art will find apparent that two or more or all of the registration server 40, activation server 46, and data store 44 maybe either hosted on the same physical platform or provided using two or more distributed platforms.

Also, it is possible to provide the service identifier, for example, the CLI and/or the device identifier and/or other credential information as a key in some embodiments of the invention in the data records.

The amount of time which elapses after the first communications message has been sent out over the PSTN before the second communications messages is sent out over using a data session established between the device 12 and the activation server 46 can be determined in any suitable manner known to one of ordinary skill in the art. For example, the second messages may be sent at one or more intervals each lasting a predetermined period of time after the first message was sent. Alternatively, the intervals may increase in duration with each reiteration of the second communications message being sent. After the expiry of a second predetermined period of time, the first communication message may be resent and the time delay process for sending the second communication message may be repeated.

The above embodiments have described how a message sent using a mode of communication (a PSTN SMS message) which provides authentication information for a service associated with a first network domain (the PSTN voice-mail service) can be used to access the same service (PSTN voicemail) via a second network domain using a different mode of communication (a IP session over a data network). It will be apparent to anyone skilled in the art that the invention may be used to access a service associated with a mode of communication which provides authentication information using other network domains, for example, a mobile network, and access these over a data network using an IP session, if the authentication information can similarly be extracted by sending a message using the first mode of communication to a registration server in the first network domain.

One embodiment enables, for example, a voice-mail message associated with a cellular mobile network telephone handset to be sent to device 12, by associating the device identifier with the authentication information the mobile handset would normally provide when seeking to access its voice-mail server.

In one embodiment, the service data which the service platform 32 has sent to provided to the device 12 may also be retained for access via the first communications mode by the device and/or one or more other devices or pushed to one or more other devices via the first network.

In one embodiment of the invention, device 12 is configured to retrieve service information associated with a plurality of different service subscriptions and to store these messages for each service subscription securely until credentials are provided to enable local access to the stored data. In this way, a user of a mobile phone can associate either mobile phone voicemail service with the device and also their landline voicemail with the device. Alternatively, two (or more) users of different mobile telephone devices could configure their voicemail to be automatically retrievable by the device. In this way, a visual or audible indication of voicemail messages left for different service subscriptions can be displayed on the same device, but only if additional authentication information is provided is the service subscription retrieved. This is achieved simply by performing the method of uniquely configuring the device 12 for each service subscription in such a way that the device 12 is capable of being associated with several service subscriptions in a data record 50.

In the above description, the communications system is described as identifying the physical communications line to which the device (12) is attached using the calling line identifier in the public switched telephone network associated with the physical communications line to which the device (12) is attached, however, any suitable mechanism for identifying the physical connection to the device (12) known in the art may be used, for example, where appropriate the connection can be identified using the service identifier for the broadband service provisioned on that communications line, and reference to the CLI refers to any suitable means known to enable the identity of the communications line to the device (12) be determined.

What is claimed is:

1. A method of generating device-specific configuration data during the initial set up of a device, to enable the device to be automatically authenticated for access to and retrieval from a service platform of service information associated with a service identifier;
   wherein the device-specific configuration data comprises credential information to authenticate a request for data retrieval from the service platform,
   the method comprising:
   during a configuration process running on the device,
   using a first mode of communication, sending to a server from the device a first message which includes a device identifier; wherein the first message is sent using said first mode of communication over a physical communications line of a wireline network and said service identifier for retrieval of service information comprises a calling line identity for said physical communications line of the wireline network;
   in which the physical communications line of the wireline network is dedicated to servicing the device;
   using a second mode of communication, from which the service platform cannot directly retrieve the service identifier, sending to a server from the device a second message including the device identifier;
   using the second mode of communication for access to a service which requires identification of the physical communications line to which the device is attached,
   processing the first message to associate the device identifier with service identifier derivable from the first mode of communication;
   processing the second message to query if the device identifier has been previously associated with the service identifier, and if so,
   sending device-specific configuration data associating the device identifier with the service identifier to the device for use during the configuration process,
   wherein after the configuration process is completed, the device-specific configuration data enables authentication using said service identifier when the device uses said second mode of communication, the device-specific configuration data comprising the credential information.

2. The method as claimed in claim 1, wherein said service identifier enables the device to use said second mode of communication with a remote server to access data associated with a service provided in a network domain associated with said first mode of communication.

3. The method as claimed in claim 1, wherein said second mode of communication comprises a data session supported by a connectionless communications protocol.

4. The method as claimed in claim 1, wherein the first message conforms to a short message service communications protocol.

5. The method as claimed in claim 1, wherein said service identifier is used to identify a subscription to a voicemail service.

6. The method as claimed in claim 5, wherein said voicemail service is associated with a first network domain accessible using said first mode of communications, and wherein said second mode of communications accesses said voicemail service using a second network domain.

7. The method as claimed in claim 1, the physical communications line of the wireline network is a switched telephone network communications line.

8. The method as claimed in claim 1, wherein the second mode of communication uses the same physical communications line as the first mode of communication.

9. The method as claimed in claim 1, wherein the physical communications line of the wireline network links the device to a local exchange of a public switched telephone network (PSTN).

10. The method as claimed in claim 1, wherein the second mode of communication uses the same physical communications line as the first mode of communication.

11. The method as claimed in claim 1, wherein the service platform stores service information associated with a plurality of different service identifiers; so that requests generated when the device uses said second mode of communication can be distinguished from requests for service information stored for other users of the service platform.

12. A method of configuring a device to enable the device to automatically generate a request for service information stored in association with a service identifier and to send the request to a service platform, the method comprising:
   determining the service identifier from a first communication sent by the device using a first mode of communication; wherein the first communication is sent using said first mode of communication over a physical communications line of a wireline network and said service identifier for retrieval of service information comprises the calling line identity for said physical communications line of the wireline network, in which the physical communications line of the wireline network is dedicated to servicing the device;
   storing the service identifier in association with a device identifier;
   sending a second communication using a second mode of communication, from which the service platform cannot directly retrieve the service identifier, to a remote platform, the communication including the device identifier;
   using the second mode of the communication for access to a service which requires identification of the physical communications line to which the device is attached;
   extracting from the second communication the device identifier;
   querying if said device identifier has been stored in association with a service identifier, and if so,
   generating configuration information dependent on said service identifier and said device identifier which is associated with the service identifier, wherein the configuration information comprises one or more credentials to authenticate a request for data retrieval from the service platform; and configuring the device using said configuration information, the configuration information configuring the device to generate at least one said request for service information, wherein when said at least one request is received by said service platform, the one or more credentials including said service identifier required to access said service information are presented to said service platform.

13. The method as claimed in claim 12, further comprising:

generating the request including said device identifier;
sending the request;
processing said request to extract said device identifier;
querying a data store with said device identifier to retrieve said service identifier;
wherein the retrieved service identifier is presented to said service platform to access said service information.

14. The method as claimed in claim 12, further comprising:

configuring the device using said configuration information including said service identifier;
generating the request including said service identifier;
processing said request to extract said service identifier to present said service identifier to said service platform.

15. A device configured in accordance with the method of claim 12.

16. The method as claimed in claim 12, wherein the physical communications line of the wireline network is a switched telephone network communications line.

17. The method as claimed in claim 12, wherein the second mode of communication uses the same physical communications line as the first mode of communication.

18. The method as claimed in claim 12, wherein the physical communications line of the wireline network links the device to a local exchange of a public switched telephone network (PSTN).

19. The method as claimed in claim 12, wherein the second mode of communication uses the same physical communications line as the first mode of communication.

20. The method as claimed in claim 12, wherein the service platform stores service information associated with a plurality of different service identifiers; so that requests generated when the device uses said second mode of communication can be distinguished from requests for service information stored for other users of the service platform.

21. The method as claimed in claim 12, further comprising:

storing the device identifier in association with a plurality of different service identifiers;
wherein, when a request for service information is received, information for each different service identifier is retrieved.

22. The method as claimed in claim 21, wherein, requests for information for each different service identifier are automatically generated, and when information is retrieved, a notification that information for said service identifier has been received is displayed on the device.

23. A method of generating device-specific configuration data during the initial set up of a device, wherein the device-specific configuration data comprises credential information to authenticate a request for data retrieval from the service platform, the method comprising:

during a configuration process running on the device:
sending from the device a first message including a device identifier to a server using a first mode of communication associable with a calling line identifier of a physical communications line in a wireline network in which physical communications line of the wireline network is dedicated to servicing the device,
sending from the device a second message including the device identifier to a server of a service platform using a second mode of communication not associable with said calling line identifier so that the server platform cannot directly retrieve the calling line identifier,
using the second mode of communication for access to a service which requires identification of the physical communications line to which the device is attached;
processing the first message to associate the device identifier with the calling line identifier, and
processing the second message to query if the device identifier has been previously associated with the calling line identifier, and if so,
sending device-specific configuration data associating the device identifier with the calling line identifier to the device for use during the configuration process,
wherein after the configuration process is completed, the device-specific configuration data enables authentication using said calling line identifier when the device uses said second mode of communication to request service information from a remote service platform for which said calling line identifier is required if access is to be granted, the device-specific configuration data comprising the credential information.

24. The method as claimed in claim 23, wherein said device is configured to retrieve said service information from said remote service platform using said second mode of communication when said physical communications line is busy with a first mode of communication.

25. The method as claimed in claim 23, wherein the second mode of communication uses the same physical communications line as the first mode of communication.

26. The method as claimed in claim 23, wherein the service platform stores service information associated with a plurality of different calling line identifiers; so that requests generated when the device uses said second mode of communication can be distinguished from requests for service information stored for other users of the service platform.

27. The method as claimed in claim 23, wherein the first message is sent using said first mode of communication over the physical communications line and said calling line identifier comprises the calling line identity for said physical communications line.

28. The method as claimed in claim 27, wherein the second mode of communication uses the same physical communications line as the first mode of communication.

29. The method as claimed in claim 27, wherein the communications line of the wireline network links the device to a local exchange of a public switched telephone network (PSTN).

* * * * *